Jan. 3, 1956
R. R. BEEZLEY
2,728,977
MEANS FOR REPLACING TIMING GEARS ON
INTERNAL COMBUSTION ENGINES
Filed Feb. 7, 1951
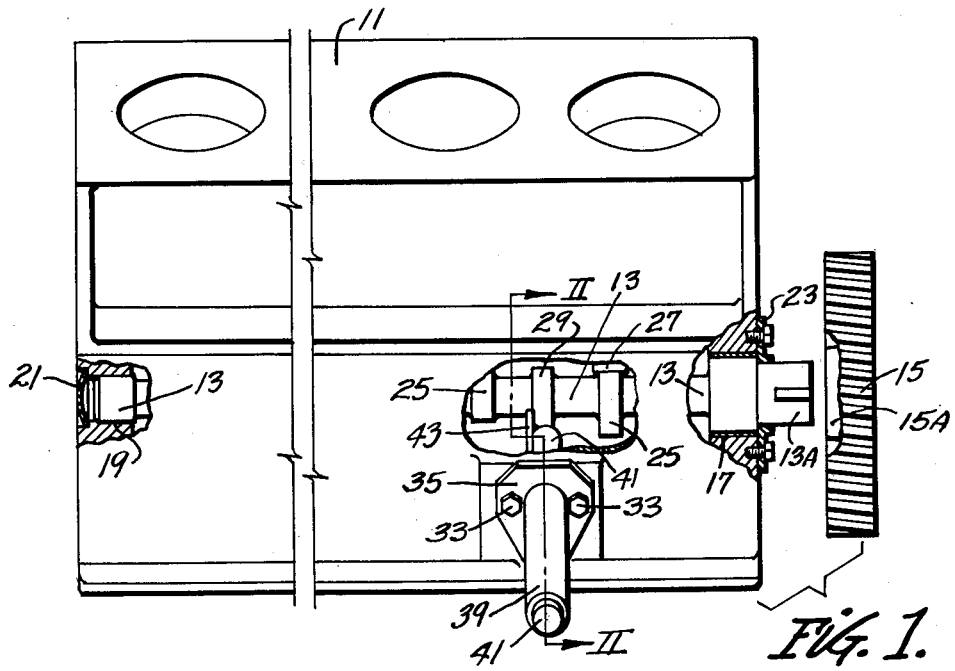
Fig. 1.
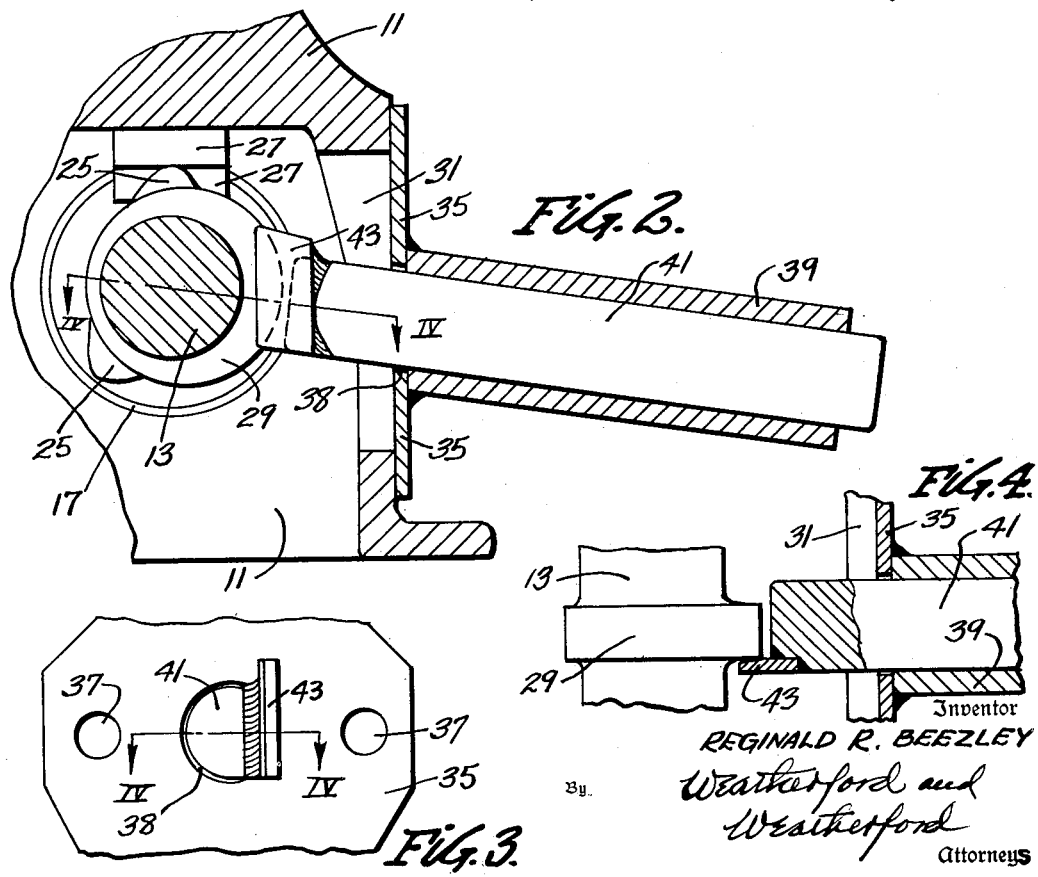
Fig. 2.
Fig. 3.
Fig. 4.
Inventor
REGINALD R. BEEZLEY
By Weatherford and
Weatherford
Attorneys

2,728,977

MEANS FOR REPLACING TIMING GEARS ON INTERNAL COMBUSTION ENGINES

Reginald R. Beezley, Memphis, Tenn.

Application February 7, 1951, Serial No. 209,879

3 Claims. (Cl. 29—283)

This invention relates to means for replacing timing gears on automobile, motor truck, or other internal combustion engine cam shafts without removing the shafts from the engines and without damage to the shaft or bearings.

Timing gears may be readily removed from engine cam shafts without removing the shafts from the engines without damage, but replacing the gears with the shaft in place usually causes damage to the bearings and particularly to the "Welch" plug closing the end of the rear bearing. Factory instructions therefore require the removal of the cam shaft from the engine before removal of the gear from the shaft and replacement of the gear. To remove the shaft, however, requires removal of the engine side plate, push rods, valve lifters, distributor plugs, and wiring precedent to removal of the shaft and their replacement subsequent to the shaft replacement, and additionally requires adjustment and resetting of valve clearances and ignition timing.

It is, therefore, common practice among mechanics, especially when on flat rate to ignore the factory instruction and do the work in much less expensive way irrespective of the probable damage done.

In doing this, after removal of the old gear, a new gear is placed on the cam shaft and driven to a seat, gambling that the displacement of the shaft will not damage the bearings or loosen up the "Welch" plug at the rear end of the shaft and cause leakage of oil from the crank case into the flywheel housing.

The object of the invention is primarily:

To provide means to prevent, without removal of the shaft, longitudinal displacement of the shaft incident to gear replacement and eliminate the consequent damage due to such displacement.

The means by which the foregoing and other objects are accomplished and the method of their accomplishment will readily be understood from the following description on reference to the accompanying drawings, in which:

Figure 1 is an elevational view of a portion of an engine block with a portion of a side wall of the block broken away to show a portion of the cam shaft in place.

Figure 2 is a transverse sectional elevation on the line II—II of Figure 1.

Figure 3 is an end elevation of the blocking tool or anvil.

Figure 4 is a fragmentary sectional plan view on the line IV—IV of Figures 2 and 3.

Referring now to the drawings in which the various parts are indicated by numerals, 11 is an engine block and crank case and 13 the half time cam shaft driven from the crank shaft (not shown) by gearing which includes a gear 15 on the cam shaft. This gear is ordinarily a composite gear having a metal hub and composite fiber web and rim but for present purposes is illustrated merely as a gear.

The cam shaft is journalled by a front bearing 17 and rear bearing 19 may be additionally journalled intermediate its length by bearings not shown.

The rear bearing is closed by a disc 21 known as a "Welch" plug which prevents escape of oil from the crank case. End play of the shaft is ordinarily prevented by a thrust plate 23 which cooperates with the hub 15A of the gear 15, and such construction is shown though obviously other means may exist.

The shaft 13 is the usual cam shaft having cams 25 for operating the valve tappets 27 and an additional fuel pump cam 29 which operates a fuel pump, not shown, exterior to the casing 11, the pump having access for its operation through a suitable opening 31 in the side wall of the casing, the opening overlying the fuel pump cam 29 and the pump being held in place by cap screws 33 which are engaged in suitably tapped holes (not shown) on opposite sides of the opening.

The present device or tool includes a member preferably a plate 35 of size to overlie the opening 31, which plate conforms substantially to a corresponding plate of the pump and has holes 37 spaced to overlie the tapped holes in the casing wall, the inner surface of the plate being adapted to seat against the wall around the opening and to be held in place by the original cap screws 33. The plate has a substantially centrally disposed hole 38 over and around which hole a cylindrical sleeve 39 is disposed and integrally secured, as by welding, to the outer side or surface of the plate. The sleeve extends outwardly from the plate, and preferably diverges downwardly as of the nature of 10 degrees from a right angle so that its axis will axially intersect the center line of the cam shaft 13. Thus disposed the sleeve is so positioned that when the plate is secured by the screws 33, the sleeve axis will aline substantially with the center longitudinally of the pump cam 29. Slidably and turnably disposed in the sleeve, is a cylindrical stem or plunger 41, which is of length to be moved inward into adjacency to the face of the cam 29 and preferably still be of length to project beyond the outer end of the sleeve. The projecting inner end of the stem may be cut away to form an offset abutment member or anvil 43, or this abutment may be a plate-like blade integrally attached as by welding. The abutment is preferably rearwardly displaced at the place of attachment slightly less than one-half the thickness of the cam 29 from the center of the stem, and thinned toward its outer end to give a wedging engagement with the cam when the stem is moved inward which effectually prevents any rearward displacement of the cam and the shaft which carries the cam.

In using the tool, after the original timing gear and fuel pump (neither shown) have been removed, the stem 41 carrying the abutment member 43 is retracted and turned to position the abutment rearward of the cam for cam engagement and the plate 35 of the tool is secured solidly to the engine casing 11 by the cap screws 33. The stem is pushed inward solidly engaging the abutment member 43 with the rear end of the cam 29, and the shaft held against rearward displacement. The replacement gear 15 is then engaged with the projecting end portion 13A of the cam shaft and driven to place. Thereafter the cap screws 33 are removed releasing the tool and the tool removed. The fuel pump may then be replaced and so far as gear replacement is concerned the motor is ready for use.

It will be understood that the sleeve 39 while preferably cylindrical may be of other cross section provided the plunger 41 slidably fits within it, even though the plunger will not then be turnable.

Having described my invention what I claim is:

1. An abutment tool adapted for use with an engine of the type having a cam shaft, a fuel pump opening in adjacency to said cam shaft, and a fuel pump removably mounted over said opening, upon removal of said fuel pump, said tool including a plate of a size to overlie and cover the fuel pump opening, a hollow sleeve secured at one end to said plate, the longitudinal axis of said sleeve being deflected out of perpendicular relative to the plane of said plate, a plunger coaxially slidably mounted in said sleeve, said plunger being of a length to extend beyond the opposite ends of said sleeve, one end of said plunger extending beyond the plate end of said sleeve through and beyond said plate, and a flat blade-like abutment member rigidly fixed substantially in tangency to one side of said plunger end, the face of said plunger end being flat and substantially perpendicular to said abutment member, said tool being mountable on said engine and when so mounted being disposed so that said axis is perpendicular to the axis of the engine cam shaft, said plunger end face substantially abuts the periphery of a shaft-carried cam, and said abutment extends into engagement with a cam carried by the cam shaft, whereby to limit endwise cam shaft movement during replacement of gearing on the cam shaft.

2. An abutment tool in accordance with claim 1 in which said blade-like abutment member is provided with a leading edge substantially parallel to said plate for engaging a shaft-carried cam.

3. An abutment tool in accordance with claim 2 in which said leading edge is thinned to form a wedge-like portion therealong.

References Cited in the file of this patent

UNITED STATES PATENTS

| | | |
|---|---|---|
| 1,174,858 | Hamilton | Mar. 7, 1916 |
| 1,859,920 | Haskins | May 24, 1932 |
| 1,941,022 | Shelley | Dec. 26, 1933 |
| 2,061,448 | Bath et al. | Nov. 17, 1936 |
| 2,113,598 | Mueller | Apr. 12, 1938 |
| 2,236,732 | Oberhoffken | Apr. 1, 1941 |
| 2,342,392 | Evans et al. | Feb. 22, 1944 |
| 2,357,295 | Thompson | Sept. 5, 1944 |